(12) United States Patent
Park et al.

(10) Patent No.: US 11,656,719 B2
(45) Date of Patent: May 23, 2023

(54) TOUCH SENSING DEVICE AND METHOD OF DRIVING THE SAME

(71) Applicant: SILICON WORKS CO., LTD., Daejeon (KR)

(72) Inventors: Sun Young Park, Daejeon (KR); Hong Kyun Jung, Daejeon (KR); Sung Chun Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/407,462

(22) Filed: Aug. 20, 2021

(65) Prior Publication Data
US 2022/0075476 A1   Mar. 10, 2022

(30) Foreign Application Priority Data

Sep. 7, 2020 (KR) ........................ 10-2020-0113551

(51) Int. Cl.
*G06F 3/041* (2006.01)
*G09G 3/36* (2006.01)
*G06F 3/044* (2006.01)

(52) U.S. Cl.
CPC ........ *G06F 3/0418* (2013.01); *G06F 3/04164* (2019.05); *G06F 3/04166* (2019.05); *G06F 3/044* (2013.01); *G06F 3/0412* (2013.01); *G09G 3/3611* (2013.01); *G09G 2310/08* (2013.01)

(58) Field of Classification Search
CPC .............. G06F 3/0418; G06F 3/04164; G06F 3/04166; G06F 3/0412; G06F 3/044; G06F 3/0416; G06F 3/0443; G06F 3/0446; G06F 3/04162; G06F 13/387; G06F 13/4291; G09G 3/3611; G09G 2310/08; G09G 3/20; G09G 2310/0267; G09G 2310/067; G09G 2330/06; G09G 2354/00

See application file for complete search history.

(56) References Cited

U.S. PATENT DOCUMENTS

| | | | |
|---|---|---|---|
| 2007/0109285 A1* | 5/2007 | Garverick | G09G 3/34 345/204 |
| 2014/0022185 A1* | 1/2014 | Ribeiro | G06F 3/017 345/173 |
| 2014/0129843 A1* | 5/2014 | Shi | G06F 21/32 713/182 |
| 2014/0347320 A1* | 11/2014 | Ribeiro | G06F 3/04184 345/174 |

(Continued)

*Primary Examiner* — Benyam Ketema
(74) *Attorney, Agent, or Firm* — Hyunho Park (57) ABSTRACT

A touch sensing device for preventing occurrence of electromagnetic interference (EMI) due to a clock includes a touch controller configured to operate in a write mode during a display period and operate in a read request mode or a read operation mode during a touch sensing period, and a touch driver configured to receive touch sensing data from a touch sensor during the touch sensing period and transmit the touch sensing data to the touch controller through a first bus and a second bus, wherein the first bus is used for clock transmission in the write mode and the read request mode and is used for data transmission in the read operation mode, and the second bus is used for data transmission in the write mode, the read request mode, and the read operation mode.

19 Claims, 8 Drawing Sheets

(56) References Cited

U.S. PATENT DOCUMENTS

| | | | |
|---|---|---|---|
| 2015/0002460 A1* | 1/2015 | Lee | G06F 3/0446 |
| | | | 345/174 |
| 2015/0370371 A1* | 12/2015 | Azumi | G06F 3/0445 |
| | | | 345/174 |
| 2016/0041210 A1* | 2/2016 | Hogan | G01R 27/2605 |
| | | | 702/65 |
| 2016/0224175 A1* | 8/2016 | Moon | G06F 3/0412 |
| 2017/0060337 A1* | 3/2017 | Kim | G06F 3/03545 |
| 2017/0090629 A1* | 3/2017 | Kim | G06F 3/04184 |
| 2017/0090643 A1* | 3/2017 | Kim | G06F 3/044 |
| 2017/0090673 A1* | 3/2017 | Kim | G06F 3/0418 |
| 2018/0150168 A1* | 5/2018 | Jung | H03M 1/12 |
| 2019/0146944 A1 | 5/2019 | Pitigoi-Aron et al. | |
| 2019/0179484 A1* | 6/2019 | Jang | G06F 3/0418 |
| 2020/0007364 A1* | 1/2020 | Akasaka | H04L 25/4923 |
| 2020/0020296 A1* | 1/2020 | Kim | G09G 3/3696 |
| 2020/0042134 A1* | 2/2020 | Lin | G06F 3/0416 |
| 2020/0097112 A1* | 3/2020 | Seo | G06F 3/044 |
| 2020/0192544 A1* | 6/2020 | Chung | G09G 3/3413 |
| 2020/0257399 A1* | 8/2020 | Guo | G06F 3/0416 |
| 2021/0020137 A1* | 1/2021 | Jang | G09G 3/3688 |
| 2021/0065602 A1* | 3/2021 | Lee | G06F 1/3287 |
| 2021/0135910 A1* | 5/2021 | Kim | H04L 25/028 |
| 2021/0191555 A1* | 6/2021 | Jo | G09G 3/3685 |
| 2021/0365156 A1* | 11/2021 | Choi | G06F 3/0446 |
| 2021/0397327 A1* | 12/2021 | Lee | G06F 3/04182 |
| 2022/0011895 A1* | 1/2022 | Park | G06F 1/3265 |
| 2022/0019331 A1* | 1/2022 | Park | G06F 3/04184 |
| 2022/0051617 A1* | 2/2022 | Hwang | G06F 1/3265 |
| 2022/0155937 A1* | 5/2022 | Jo | G09G 3/3225 |
| 2022/0171515 A1* | 6/2022 | Lin | G06F 3/04162 |
| 2022/0179514 A1* | 6/2022 | Lee | G06F 3/04184 |
| 2022/0187977 A1* | 6/2022 | Jung | G06F 3/04162 |
| 2022/0197416 A1* | 6/2022 | Lim | G09G 3/3685 |

* cited by examiner

TOUCH SENSING DEVICE AND METHOD OF DRIVING THE SAME

CROSS-REFERENCE TO RELATED APPLICATIONS

This application claims the benefit of the Korean Patent Applications No. 10-2020-0113551 filed on Sep. 7, 2020, which are hereby incorporated by reference as if fully set forth herein.

FIELD

The present disclosure relates to a touch sensing device and a method of driving the same.

BACKGROUND

As display devices for displaying images, liquid crystal displays (LCDs) using liquid crystals and organic light-emitting diode (OLED) displays using OLEDs are typical displays.

Recently, moving away from usual input manners such as buttons, keyboards, and mouses, display devices having touch screen panels capable of detecting a touch input by a user's finger or a stylus pen (hereinafter referred to as "touch display devices") are widely used. The above-described touch display devices include touch sensing devices.

A touch display driver for driving the touch display device includes a display driver for driving a display device and a touch sensing device for detecting the presence or absence of a touch and a touch coordinate (or a touch position). Specifically, the touch sensing device detects touch sensing data by driving touch sensors (or touch electrodes) and detects touch information including the presence or absence of a touch or a touch coordinate using the detected touch sensing data.

In particular, there is a problem in that, due to a clock transmitted together with touch sensing data when the touch sensing data is transmitted from a read-out integrated circuit (IC) to a touch controller, electromagnetic interference (EMI) is increased and a plurality of read-out ICs are connected to the touch controller and thus lines occupy a large area.

SUMMARY

Accordingly, a technical objective of the present disclosure is to provide a touch sensing device in order for preventing occurrence of electromagnetic interference (EMI) due to a clock and reducing a line area between a plurality of read-out integrated circuits (ICs) and a touch controller, and a method of driving the same.

According to an aspect of the present disclosure, there is provided a touch sensing device including a touch controller configured to operate in a write mode during a display period and operate in a read request mode or a read operation mode during a touch sensing period, and a touch driver configured to receive touch sensing data from a touch sensor during the touch sensing period and transmit the touch sensing data to the touch controller through a first bus and a second bus, wherein the first bus is used for clock transmission in the write mode and the read request mode and is used for data transmission in the read operation mode, and the second bus is used for data transmission in the write mode, the read request mode, and the read operation mode.

According to another aspect of the present disclosure, there is provided a method of driving a touch sensing device, which includes operating a touch controller in a write mode during a display period, and operating the touch controller in a read request mode during a touch sensing period, and operating the touch controller in a read operation mode during the touch sensing period in which the touch driver receives the touch sensing data from the touch sensor through a first bus and a second bus, wherein the first bus is used for clock transmission in the write mode and the read request mode and is used for data transmission in the read operation mode, and the second bus is used for data transmission in the write mode, the read request mode, and the read operation mode.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display device according to the present disclosure will be described in detail with reference to FIGS. 1 to 4.

Figure 1:
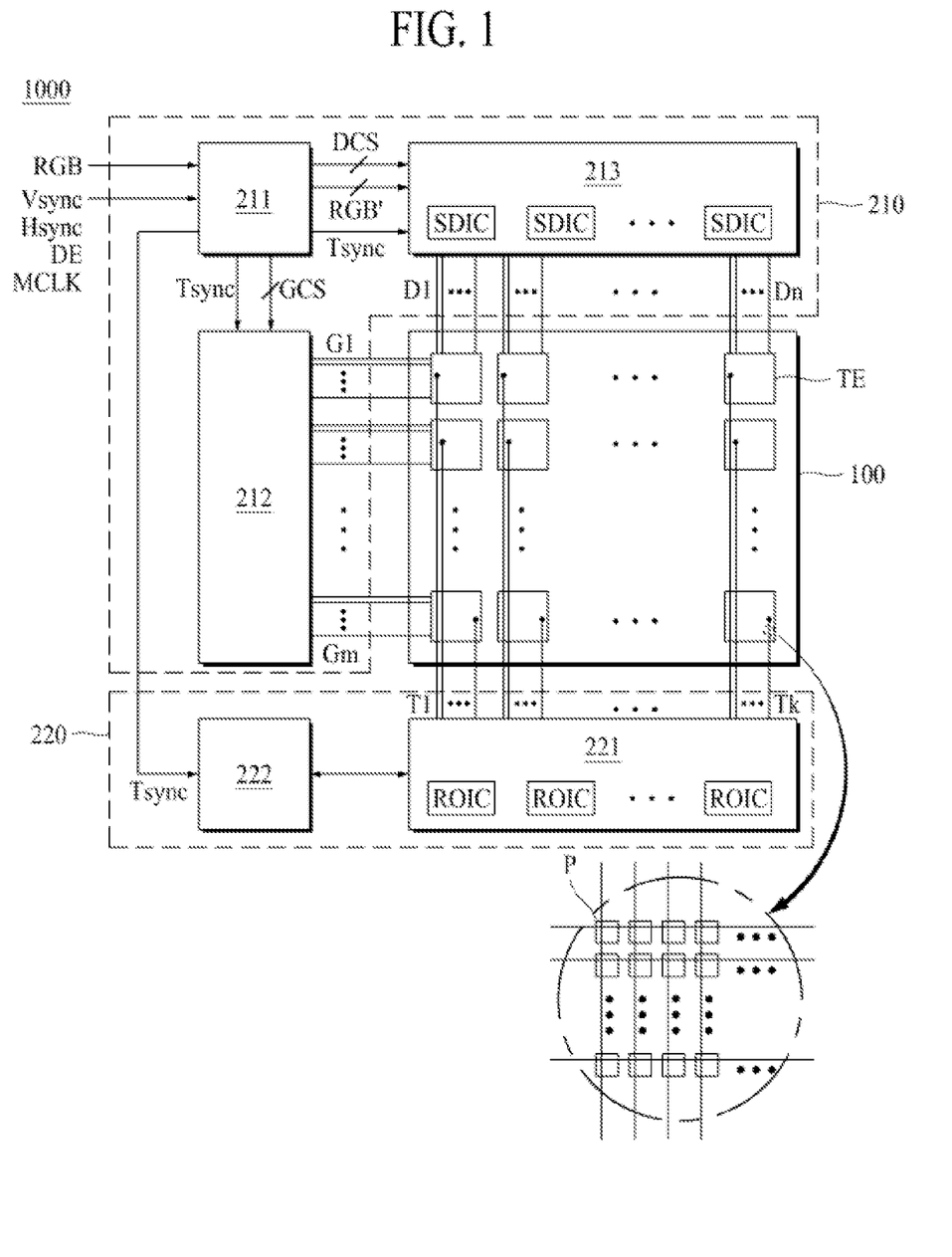
FIG. 1 is a block diagram illustrating a general touch display device.
Figure 2:
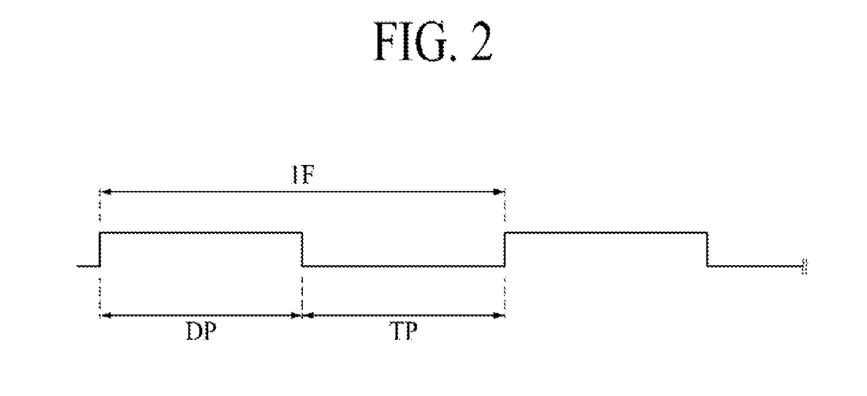
FIG. 2 is a timing diagram illustrating a display period and a touch sensing period in one frame of the general touch display device.
Figure 3:
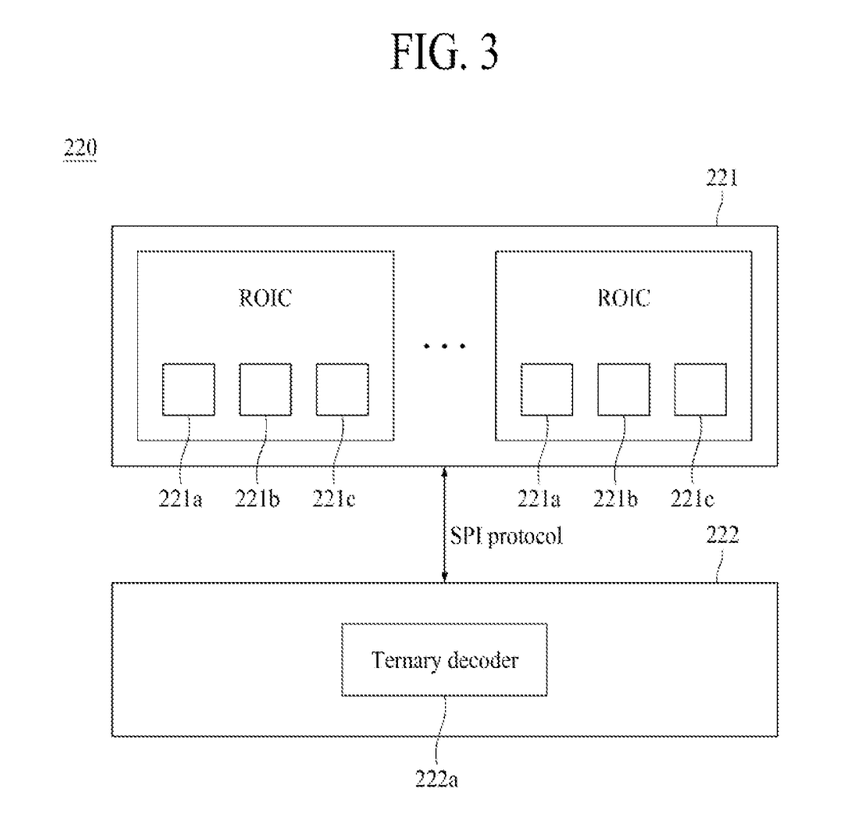
FIG. 3 is a block diagram illustrating a touch sensing device according to one embodiment of the present disclosure.
Figure 4:
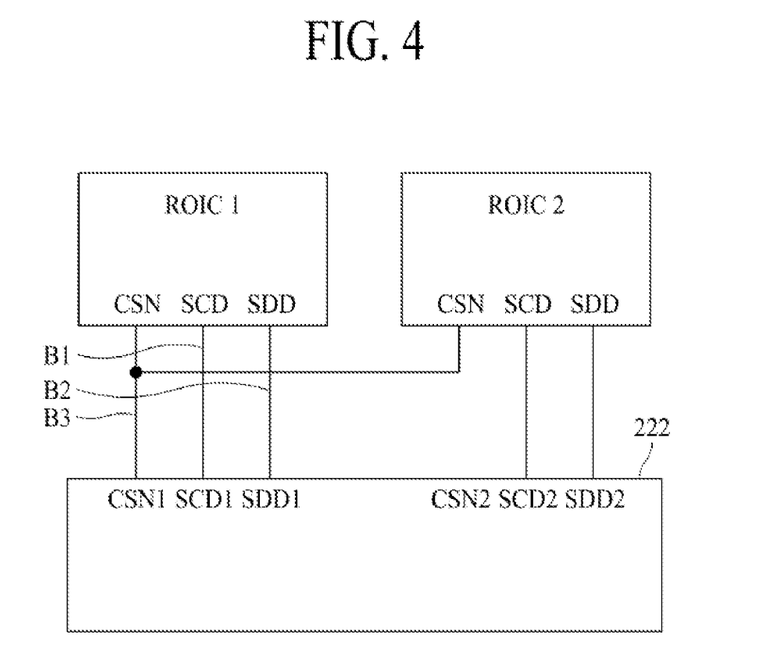
FIG. 4 is a block diagram illustrating a line connection between read-out integrated circuits (ICs) and a touch controller according to one embodiment of the present disclosure.

FIG. 1 is a block diagram illustrating a general touch display device, FIG. 2 is a timing diagram illustrating a display period and a touch sensing period in one frame of the general touch display device. FIG. 3 is a block diagram illustrating a touch sensing device according to one embodiment of the present disclosure, and FIG. 4 is a block diagram illustrating a line connection between read-out integrated circuits (ICs) and a touch controller according to one embodiment of the present disclosure.

Referring to FIG. 1, a display device 1000 according to one embodiment of the present disclosure includes a display panel 100, a display driver 210, and a touch sensing device 220.

The display device 1000 performs a display function and a touch sensing function and may be implemented as a flat panel display such as a liquid crystal display (LCD) or an organic light-emitting diode (OLED) display.

As shown in FIG. 2, the display panel 100 may be operated during a display period DP and a touch sensing period TP. The display panel 100 displays an image using light emitted from a backlight unit during the display period DP and serves as a touch panel for touch sensing during the touch sensing period TP.

The display panel 100 displays an image of predetermined gradation or receives a touch. The display panel 100 may be an in-cell touch type display panel using a capacitive scheme. Alternatively, the display panel 100 may be an in-cell touch type display panel using a self-capacitive scheme or an in-cell touch type display panel using a mutual-capacitive scheme.

The display panel 100 includes a plurality of gate lines G1 to Gm, a plurality of data lines D1 to Dn, a plurality of pixels P, a plurality of touch sensors TE, and a plurality of touch lines T1 to Tk.

During the display period DP, each of the plurality of gate lines G1 to Gm receives a scan pulse. During the display period DP, each of the plurality of data lines D1 to Dn receives a data signal. The plurality of gate lines G1 to Gm and the plurality of data lines D1 to Dn are located to intersect with each other on a substrate to define a plurality of pixel regions. Each of the plurality of pixels P may include a thin film transistor (TFT) (not shown) connected to an adjacent gate line and an adjacent data line, a pixel electrode (not shown) connected to the TFT, and a storage capacitor (not shown) connected to the pixel electrode.

Each of the plurality of touch sensors TE may serve as a touch electrode for sensing a touch or serve as a common electrode for forming an electric field together with the pixel electrode to drive a liquid crystal. That is, each of the plurality of touch sensors TE may be used as a touch electrode during the touch sensing period TP and may be used as a common electrode during the display period DP. Accordingly, each of the plurality of touch sensors TE may be made of a transparent conductive material.

Since each of the plurality of touch sensors TE is used as a self-capacitive type touch sensor during the touch sensing period TP, each of the plurality of touch sensors TE should have a size which is greater than a minimum contact size between a touch object and the display panel 100. Accordingly, each of the plurality of touch sensors TE may have a size corresponding to one or more pixels P. The plurality of touch sensors TE may be disposed at regular intervals along a plurality of horizontal lines and a plurality of vertical lines. During the display period DP, each of the plurality of touch lines T1 to Tk supplies a common voltage to a corresponding touch sensor TE. The plurality of touch lines T1 to Tk are connected to the plurality of touch sensors TE.

During the display period DP, the display driver 210 supplies data signals to the plurality of pixels P included in the display panel 100 to allow an image to be displayed through the display panel 100.

The display driver 210 includes a timing controller 211, a gate driver 212, and a data driver 213.

The timing controller 211 receives various timing signals including a vertical synchronization signal Vsync, a horizontal synchronization signal Hsync, a data enable (DE) signal, and a clock signal CLK from an external system (not shown) and generates a gate control signal (GCS) for controlling the gate driver 212 and a data control signal (DCS) for controlling the data driver 213. In addition, the timing controller 211 receives an image signal RGB from the external system, converts the image signal RGB into an image signal RGB' in the form capable of being processed in the data driver 213, and outputs the image signal RGB'.

Meanwhile, the timing controller 211 may compress an external data enable signal transmitted from the external host system into a preset display period DP, thereby generating an internal data enable signal iDE. The timing controller 211 may generate the touch synchronization signal Tsync for time-dividing one frame period into the display period DP and the touch sensing period TP according to timings of the vertical synchronization signal Vsync and the internal data enable signal iDE. The timing controller 211 may transmit the touch synchronization signal Tsync to the gate driver 212, the data driver 213, a touch driver 221, and a touch controller 222.

The host system converts the digital image data RGB into a format suitable for being displayed on the display panel 100. The host system transmits the timing signals together with the digital image data RGB to the timing controller 211. The host system is implemented as any one among a television system, a set-top box, a navigation system, a digital versatile disc (DVD) player, a blu-ray player, a personal computer (PC), a home theater system, and a phone system and receives an input image.

Meanwhile, the host system may receive touch input coordinates from the touch controller 222 and execute an application program in conjunction with the received touch input coordinates.

During the display period DP, the gate driver 212 receives the gate control signal GCS from the timing controller 211. The gate control signal GCS may include a gate start pulse GSP, a gate shift clock GSC, and a gate output enable signal. The gate driver 212 generates a gate pulse (or a scan pulse) synchronized with the data signal through the received gate control signal GCS, shifts the generated gate pulse, and sequentially supplies the shifted gate pulse to the gate lines G1 to Gm. To this end, the gate driver 212 may include a plurality of gate drive ICs (not shown). During the display period DP, the gate drive ICs sequentially supply the gate pulse synchronized with the data signal to the gate lines G1 to Gm under the control of the timing controller 211 to select a data line in which the data signal is written. The gate pulse swings between a gate high voltage and a gate low voltage.

During the touch sensing period TP, the gate driver 212 may supply a gate low voltage VGL to the gate lines G1 to Gm without the generation of the gate pulse. Accordingly, the gate lines G1 to Gm supply the gate pulse to the TFT of each pixel to sequentially select a data line in which the data signal is to be written in the display panel 100 during the display period DP and hold the gate low voltage VGL during the touch sensing period TP to prevent an output variation of the touch sensors TE.

During the display period DP, the data driver 213 receives the data control signal DCS and the image signal RGB' from the timing controller 211. The data control signal DCS may include a source start pulse SSP, a source sampling clock SSC, and a source output enable signal SOE. The source start pulse SSP controls data sampling start timings of n source drive ICs (not shown) constituting the data driver 213. The source sampling clock SSC is a clock signal that controls a sampling timing of data in each of the n source drive ICs. The source output enable signal SOE controls an output timing of each of the n source drive ICs.

In addition, the data driver 213 converts the received image signal RGB' into an analog data signal and supplies the analog data signal to the pixels P through the plurality of data lines D1 to Dn.

During the touch sensing period TP, the touch sensing device 220 senses a touch through the touch sensors TE. Specifically, the touch sensing device 220 supplies touch driving signals to the touch sensors TE to drive the touch sensors TE and senses a variation in capacitance generated when the touch sensors TE are touched.

When the display panel 100 is implemented as a mutual-capacitive display panel, a read-out IC ROIC may include a drive circuit for generating touch driving signals for driving the touch sensors TE and supplying the touch driving signals to the touch sensors TE through the touch lines T1 to Tk, and a sensing circuit for detecting a variation in capacitance of the touch sensors TE through the touch lines T1 to Tk to generate touch sensing data.

Alternatively, when the display panel 100 is implemented as a self-capacitive type display panel, the read-out IC ROIC may supply the touch driving signals to the touch sensors TE using a single circuit and acquire touch sensing data from the touch sensors TE.

Referring to FIGS. 1 and 3, the touch sensing device 220 includes the touch driver 221 and the touch controller 222.

During the touch sensing period TP, the touch driver 221 drives the touch sensors TE to acquire touch sensing data from the touch sensors TE. According to one embodiment of the present disclosure, the touch driver 221 converts received binary symbol touch sensing data into ternary symbol touch sensing data and transmits the ternary symbol touch sensing data to the touch controller 222.

As shown in FIGS. 1 and 3, the touch driver 221 includes a plurality of read-out ICs ROIC.

During the display period DP, the read-out IC ROIC supplies a common voltage to the touch sensors TE through the touch lines T1 to Tk. Accordingly, the touch sensors TE serve as a common electrode during the display period DP.

In addition, in the above-described embodiment, although a source drive IC SDIC and the read-out IC ROIC have been illustrated as being implemented as separate components, the source drive IC SDIC and the read-out IC ROIC may be implemented in the form of being integrated into a single chip.

According to an embodiment of the present disclosure, the read-out IC ROIC includes a receiver 221a for receiving binary symbol touch sensing data TSS from the touch sensor TE during the touch sensing period TP, a first converter 221b for converting the binary symbol touch sensing data TSS into ternary symbol touch sensing data TTSS, and a transmitter 221c for transmitting the converted ternary symbol touch sensing data TTSS. In particular, the first converter 221b may convert the binary symbol touch sensing data TSS into first ternary symbol touch sensing data TTSS1 and second ternary symbol touch sensing data TTSS2. Accordingly, the transmitter 221c transmits the first ternary symbol touch sensing data TTSS1 through a first bus B1 and transmits the second ternary symbol touch sensing data TTSS2 through a second bus B2. However, a process of converting the binary symbol touch sensing data TSS into the ternary symbol touch sensing data TTSS will be described in detail below with reference to FIGS. 7 to 10.

According to an embodiment of the present disclosure, the touch controller 222 includes a second converter 222a for converting the ternary symbol touch sensing data TTSS received from the read-out IC ROIC of the touch driver 221 into binary symbol touch sensing data. In this case, the second converter 222a may be a ternary decoder.

The touch controller 222 may analyze the binary symbol touch sensing data converted by the second converter 222a using a preset touch recognition algorithm to calculate a coordinate value of a touch input position. Coordinate information of the touch input position output from the touch controller 222 is transmitted to the external host system.

As shown in FIG. 3, the touch controller 222 communicates with a plurality of read-out ICs ROIC using a serial peripheral interface (SPI) protocol, and the touch controller 222 operates as a master, and the read-out ICs ROIC operate as slaves.

According to the present disclosure, the read-out ICs ROIC shares at least one among the first to third buses B1, B2, and B3. Accordingly, the plurality of read-out ICs ROIC may be connected to the touch controller 222 through at least one bus having a multi-point or multi-drop structure.

As shown in FIG. 4, first buses B1 connect clock terminals SCD of a plurality of read-out ICs ROIC1 and ROIC2 to different clock terminals SCD1 and SCD2 of the touch controller 222. For example, one first bus B1 connects the clock terminal SCD of the first read-out IC ROIC1 to a first clock terminal SCD1 of the touch controller 222, and the other first bus B1 connects the clock terminal SCD of the second read-out IC ROIC2 to a second clock terminal SCD2 of the touch controller 222.

In addition, second buses B2 connect data terminals SDD of the plurality of read-out ICs ROIC1 and ROIC2 to different data terminals SDD1 and SDD2 of the touch controller 222. For example, one second bus B2 connects the data terminal SDD of the first read-out IC ROIC1 to a first data terminal SDD1 of the touch controller 222, and the other second bus B2 connects the data terminal SDD of the second read-out IC ROIC2 to a second data terminal SDD2 of the touch controller 222.

According to one embodiment of the present disclosure, the plurality of read-out ICs ROIC1 and ROIC2 share the third bus B3. That is, the plurality of read-out ICs ROIC1 and ROIC2 are connected to the touch controller 222 through a multi-point bus structure. For example, the third bus B3 connects a first chip selection terminal SCN1 of the touch controller 222 to a chip select terminal SCN of the first read-out IC ROIC1 and a chip select terminal SCN of the second read-out IC ROIC2.

Thus, the number of lines between the touch controller 222 and the plurality of read-out ICs ROIC1 and ROIC2 is reduced, and thus areas of the touch controller 222 and the plurality of read-out ICs ROIC1 and ROIC2 can be reduced.

Hereinafter, a method of driving a touch sensing device according to one embodiment of the present disclosure will be described in detail with reference to FIGS. 5 to 11.

Figure 5:
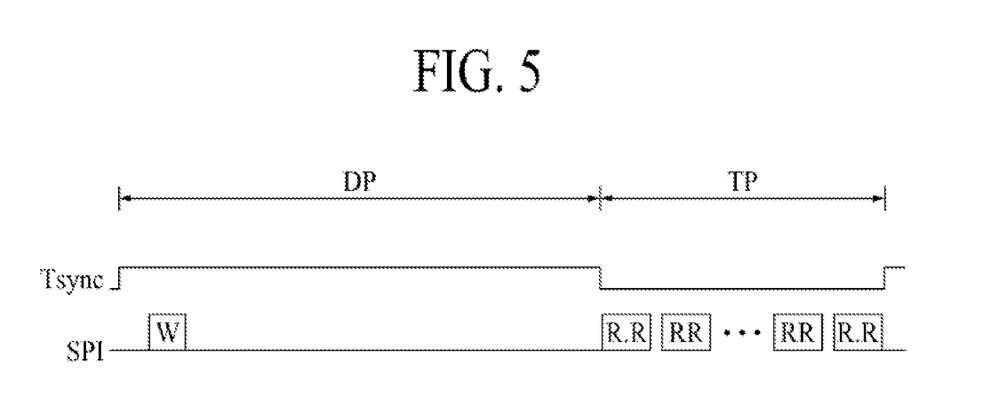
FIG. 5 is a timing diagram illustrating signals transmitted between the read-out ICs and the touch controller according to one embodiment of the present disclosure.
Figure 6:
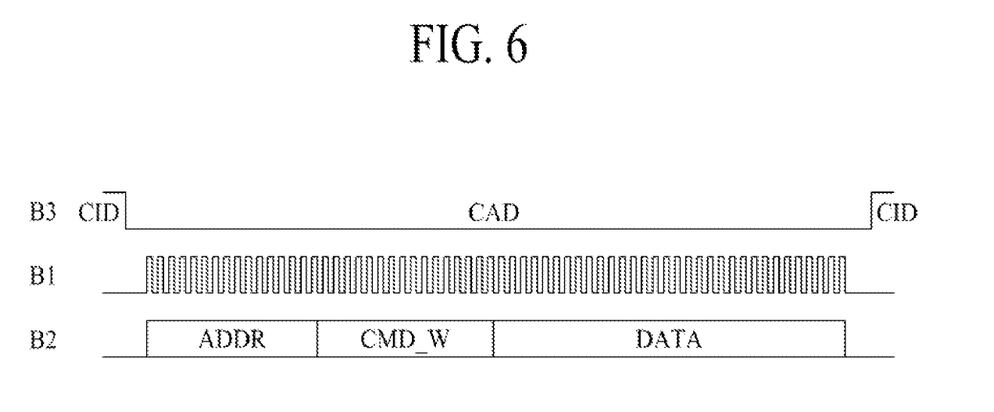
FIG. 6 is a timing diagram illustrating signals transmitted through first to third buses in a write mode.
Figure 7:
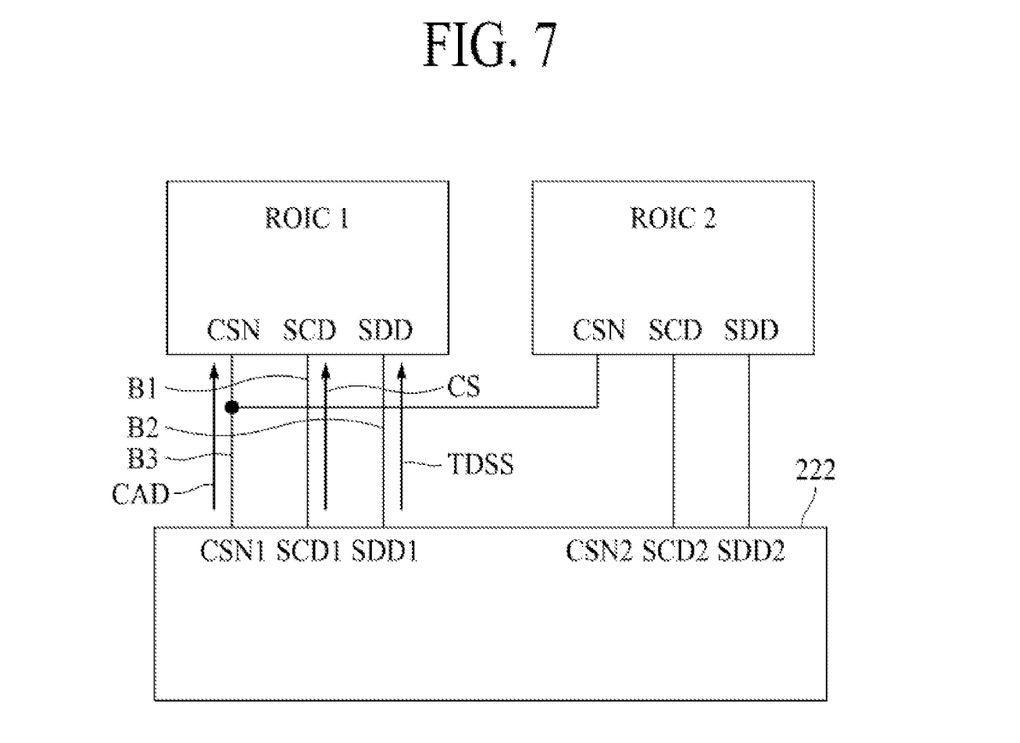
FIG. 7 is a block diagram for describing a signal transmission direction in the write mode.
Figure 8:
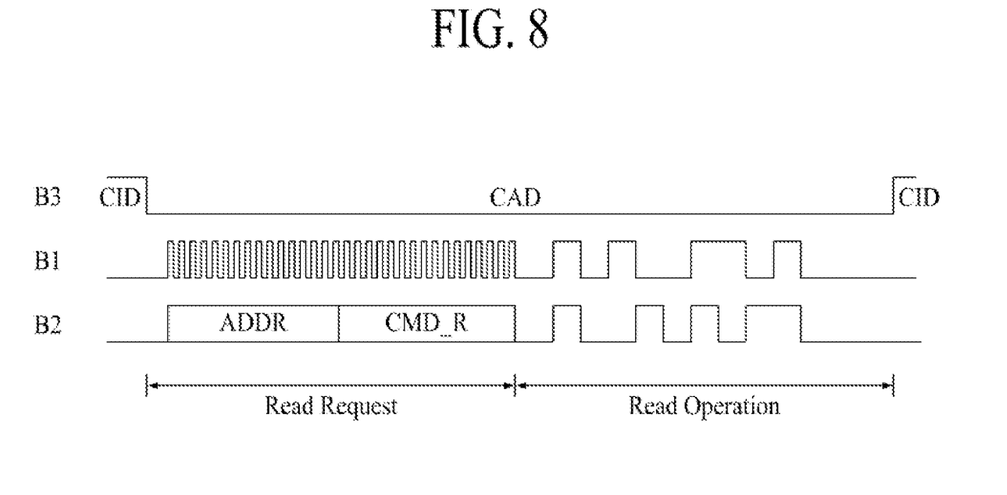
FIG. 8 is a timing diagram illustrating signals transmitted through the first to third buses in a read request mode and a read operation mode.
Figure 9:
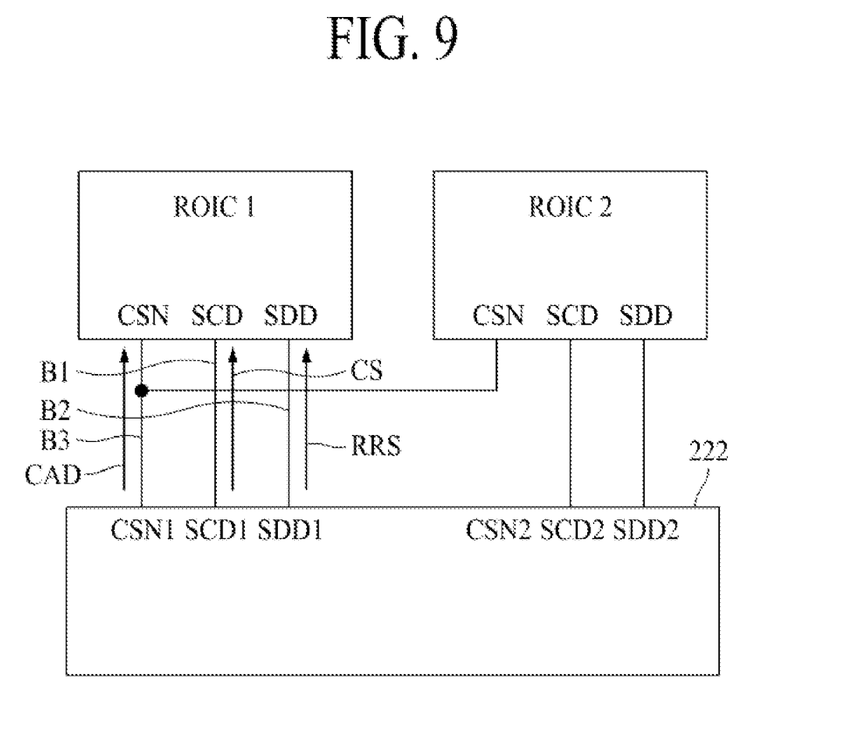
FIG. 9 is a block diagram for describing a signal transmission direction in the read request mode.
Figure 10:
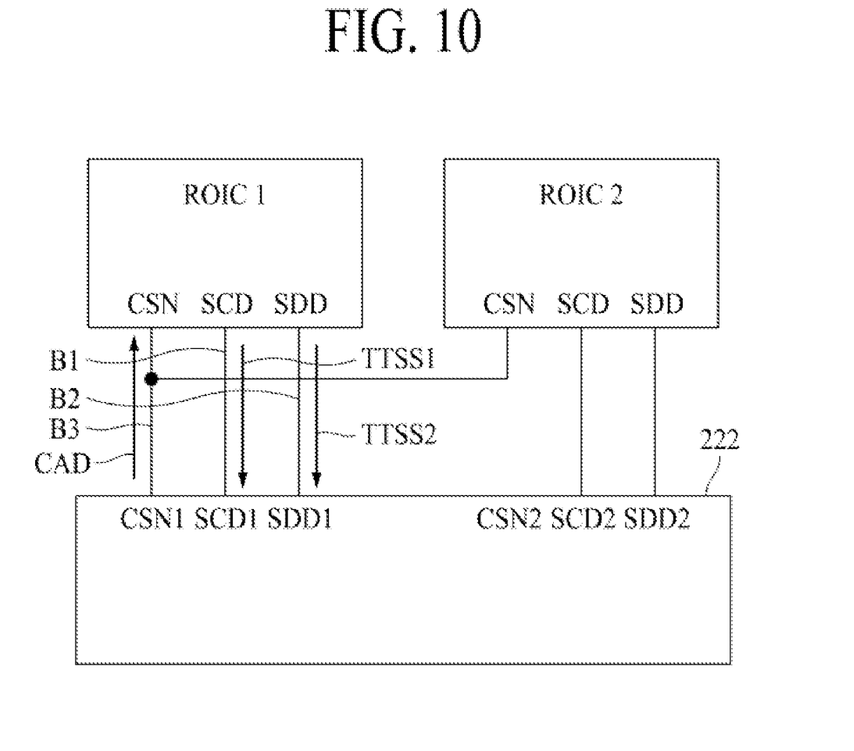
FIG. 10 is a block diagram for describing a signal transmission direction in the read operation mode.
Figure 11:
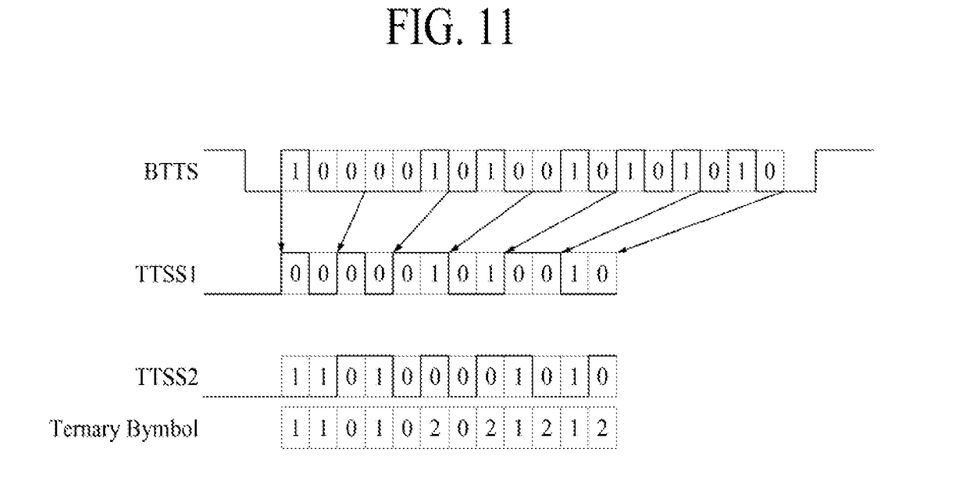
FIG. 11 is a diagram illustrating a correspondence relationship between touch sensing data and ternary symbol touch sensing data according to one embodiment of the present disclosure.

FIG. 5 is a timing diagram illustrating signals transmitted between the read-out ICs and the touch controller according to one embodiment of the present disclosure, FIG. 6 is a timing diagram illustrating signals applied to the first to third buses in a write mode, and FIG. 7 is a block diagram for describing a signal transmission direction in the write mode. FIG. 8 is a timing diagram illustrating signals applied to the first to third buses in a read request mode and a read operation mode, FIG. 9 is a block diagram for describing a signal transmission direction in the read request mode, and FIG. 10 is a block diagram for describing a signal transmission direction in the read operation mode. FIG. 11 is a diagram illustrating a correspondence relationship between the binary symbol touch sensing data and the ternary symbol touch sensing data according to one embodiment of the present disclosure.

As described above, referring to FIG. 5, the touch synchronization signal Tsync time-divides one frame period into the display period DP and the touch sensing period TP.

The touch controller 222 according to the present disclosure operates in a write mode W during the display period DP through SPI communication and operates in a read mode RR during the touch sensing period TP. In this case, since the touch controller 222 operates in the read mode RR with respect to each of the plurality of read-out ICs ROIC1 and ROIC2, the touch controller 222 may operate several times in the read mode RR during the touch sensing period TP.

Referring to FIGS. 6 to 10, the touch controller 222 transmits communication activation data CAD for activating communication between the first and second read-out ICs ROIC1 and ROIC2 and read-out ICs through the third bus B3 in the write mode W and the read mode RR. For example, the touch controller 222 transmits the communication activation data CAD for activating communication with the first read-out IC ROIC1 in the write mode W and the read mode RR. In this case, when the touch controller 222 does not operate in the write mode W and the read mode RR, the touch controller 222 transmits communication deactivation data CID through the third bus B3.

The read mode RR is divided into a read request mode and a read operation mode.

Referring to FIGS. 6 and 7, in the write mode W activated during the display period DP, the touch controller 222 may set a state of the first read-out IC ROIC1. Specifically, the touch controller 222 transmits a clock CS to the first read-out IC ROIC1 through the first bus B1 and transmits touch drive setting data TDSS to the first read-out IC ROIC1 through the second bus B2. In this case, the touch drive setting data TDSS may include an address ADDR, a write command CMD_W, and setting data DATA.

Referring to FIGS. 8 to 10, the read mode RR activated during the touch sensing period TP includes the read request mode in which the touch controller 222 requests for the first and second ternary symbol touch sensing data TTSS1 and TTSS2 to the touch driver 221 and the read operation mode in which the touch driver 221 transmits the first and second ternary symbol touch sensing data TTSS1 and TTSS2 to the touch controller 222

Referring to FIGS. 8 and 9, in the read request mode, the touch controller 222 transmits a clock to the first read-out IC ROIC1 of the touch driver 221 through the first bus B1 and transmits read request data RRS to the first read-out IC ROIC1 through the second bus B2. Accordingly, the first read-out IC ROIC1 of the touch driver 221 receives the clock from the touch controller 222 through the first bus B1 and receives the read request data RRS from the touch controller 222 through the second bus B2. In this case, the read request data RRS may include an address ADDR and a read command CMD_R.

Referring to FIGS. 8 and 10, in the read operation mode, the touch driver 221 converts binary symbol touch sensing data TSS received from the touch sensor TE into ternary symbol touch sensing data TTSS and transmits the converted ternary symbol touch sensing data TTSS to the touch controller 222 through the first bus B1 and second bus B2.

In this case, the converted ternary symbol touch sensing data TTSS includes the first and second ternary symbol touch sensing data TTSS1 and TTSS2, and the first and second ternary symbol touch sensing data TTSS1 and TTSS2 are transmitted to the touch controller 222 through the first and second buses B1 and B2.

In particular, as shown in FIGS. 10 and 11, the first read-out IC ROIC1 of the touch driver 221 according to the present disclosure transmits the ternary symbol first and second touch sensing data TTSS1 and TTSS2, which are converted from binary symbol touch sensing data BTSS generated from the touch sensor TE, to the touch controller 222 through the first and second buses B1 and B2.

Referring to FIG. 11 and Table 1, binary symbol touch sensing data of 100001010010101010 . . . is divided into (100), (001), (010), (010), (101), and (010), and the pieces of divided binary symbol touch sensing data are converted into (11), (01), (02), (02), (12), and (02) which are ternary symbols, and thus the first and second ternary symbol touch sensing data TTSS1 and TTSS2 become 0000010101 . . . and 1101000010 . . . , respectively. The first ternary symbol touch sensing data TTSS1 and the second ternary symbol touch sensing data TTSS2 are simultaneously transmitted to the touch controller 222 through the first bus B1 and the second bus B2, respectively.

TABLE 1

| Binary symbol | | | | Ternary symbol | | |
|---|---|---|---|---|---|---|
| B2 | B1 | B0 | Decimal | First symbol | Second symbol | Symbol pair |
| 0 | 0 | 0 | 0 | 0 | 0 | 0, 0 |
| 0 | 0 | 1 | 1 | 0 | 1 | 0, 1 |
| 0 | 1 | 0 | 2 | 0 | 2 | 0, 2 |
| 0 | 1 | 1 | 3 | 1 | 0 | 1, 0 |
| 1 | 0 | 0 | 4 | 1 | 1 | 1, 1 |
| 1 | 0 | 1 | 5 | 1 | 2 | 1, 2 |
| 1 | 1 | 0 | 6 | 2 | 0 | 2, 0 |
| 1 | 1 | 1 | 7 | 2 | 1 | 2.1 |

According to the present disclosure, a checksum bit, a parity bit, and a cyclic redundancy check (CRC) bit for detecting occurrence of an error according to communication may be added to the binary symbol touch sensing data BTSS received from the touch sensor TE, and these error detection bits together with the binary symbol touch sensing data BTSS may be converted into the ternary symbol touch sensing data TTSS. As described above, according to the embodiment of the present disclosure, since the first and second ternary symbol touch sensing data TTSS1 and TTSS2 are simultaneously transmitted, data transmission speed may be improved.

Hereinafter, a display device according to another embodiment of the present disclosure will be described in detail with reference to FIG. 12.

Figure 12:
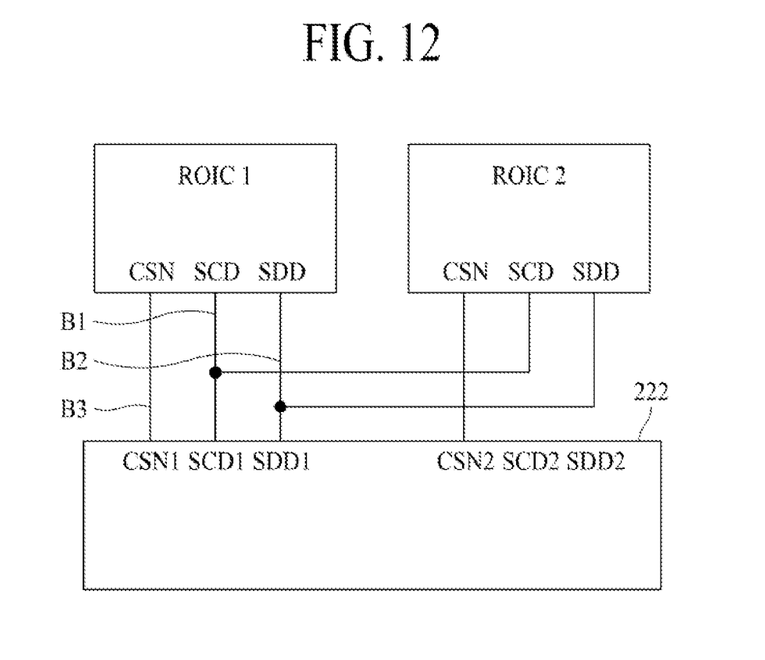
FIG. 12 is a block diagram illustrating a line connection between read-out ICs and a touch controller according to another embodiment of the present disclosure.

FIG. 12 is a block diagram illustrating a line connection between read-out ICs and a touch controller according to another embodiment of the present disclosure.

As shown in FIG. 12, according to another embodiment of the present disclosure, a plurality of read-out ICs ROIC1 and ROIC2 share a first bus B1 and a second bus B2. That is, the first bus B1 and the second bus B2 connect the plurality of read-out ICs ROIC1 and ROIC2 to a touch controller 222 using a multi-point bus structure. For example, the first bus B1 connects a first clock terminal SCD1 of the touch controller 222 to a clock terminal SCD of the first read-out IC ROIC1 and a clock terminal SCD of the second read-out IC ROIC2. In addition, the second bus B2 connects the first data terminal SDD1 of the touch controller 222 to a data terminal SDD of the first read-out IC ROIC1 and a data terminal SDD of the second read-out IC ROIC2.

In addition, the third bus B3 connects chip selection terminals CSN of the plurality of read-out ICs ROIC1 and ROIC2 to a plurality of chip selection terminals CSN of the touch controller 222. For example, one third bus B3 connects a first chip selection terminal CSN1 of the touch controller 222 to the chip selection terminal CSN of the first read-out IC ROIC1, and the other third bus B3 connects a second chip selection terminal CSN2 of the touch controller 222 to the chip selection terminal CSN of the second read-out IC ROIC2.

By designating one among upper bits of the address ADDR, the first read-out IC ROIC1 sets the corresponding one bit as "0," and the second read-out IC ROIC2 sets the corresponding one bit as "1" so that the first read-out IC ROIC1 and the second read-out IC ROIC2 may be individually controlled for write driving and read driving through the setting of the corresponding one bit of the address ADDR.

According to another embodiment of the present disclosure, the first and second read-out ICs ROIC1 and ROIC2 may be controlled according to any one among the upper bits of the address ADDR of the touch drive setting data TDSS transmitted through the second bus B2 in the write mode W or the read request mode of the touch controller 222. For example, when any one of the upper bits of the address ADDR of the touch drive setting data TDSS is referred to as a read-out IC selection bit, the touch controller 222 transmits a read-out IC selection bit of "0" to the first read-out IC ROIC1 and transmits a read-out IC selection bit of "1" to the second read-out IC ROIC2. In this case, the read-out IC selection bit of "0" may activate communication between the touch controller 222 and the read-out IC, and the read-out IC selection bit of "1" may deactivate the communication between the touch controller 222 and the read-out IC. Alternatively, the read-out IC selection bit of "0" may deactivate the communication between the touch controller 222 and the read-out IC, and the read-out IC selection bit of "1" may activate the communication between the touch controller 222 and the read-out IC. Accordingly, the touch controller 222 may activate communication with any one of the first and second read-out ICs ROIC1 and ROIC2 and deactivate communication with the other one thereof. That is, the read-out IC selection bit may serve the same as the above-described communication activation data CAD.

Accordingly, since the number of lines located between the touch controller 222 and the touch driver 221 including the plurality of first and second read-out ICs ROIC1 and ROIC2 is reduced, an area between the touch driver 221 and the touch controller 222 can be reduced.

Hereinafter, a display device according to still another embodiment of the present disclosure will be described in detail with reference to FIG. 13.

Figure 13:
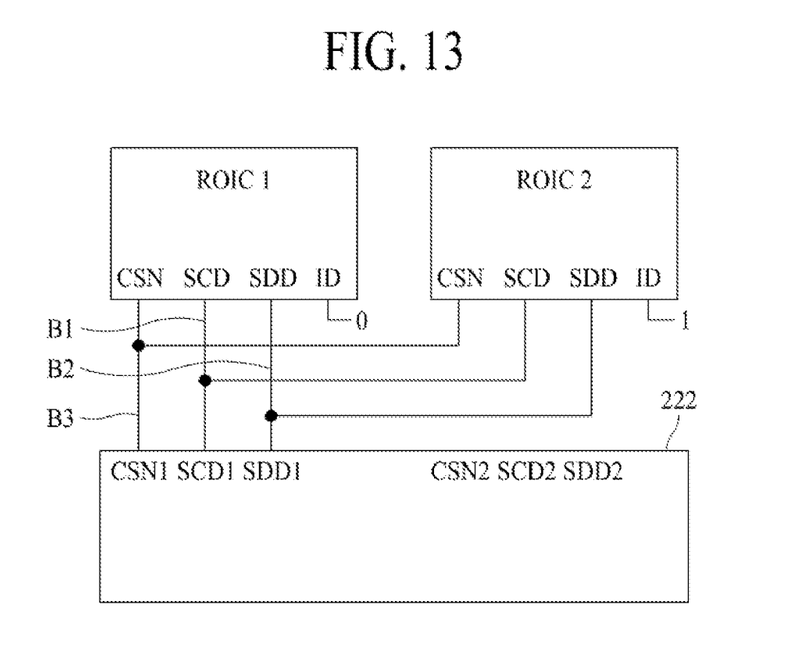
FIG. 13 is a block diagram illustrating a line connection between read-out ICs and a touch controller according to still another embodiment of the present disclosure.

FIG. 13 is a block diagram illustrating a line connection between read-out ICs and a touch controller according to still another embodiment of the present disclosure.

As shown in FIG. 13, according to still another embodiment of the present disclosure, a plurality of first and second read-out ICs ROIC1 and ROIC2 share first to third buses B1, B2, and B3. That is, the first to third buses B1, B2, and B3 connect the plurality of first and second read-out ICs ROIC1 and ROIC2 to a touch controller 222 using a multi-point bus structure.

The first bus B1 connects different clock terminals SCD of the plurality of first and second read-out ICs ROIC1 and ROIC2 to one clock terminal SCD of the touch controller 222. For example, the first bus B1 connects a first clock terminal SCD1 of the touch controller 222 to a clock terminal SCD of the first read-out IC ROIC1 and a clock terminal SCD of the second read-out IC ROIC2.

The second bus B2 connects different data terminals SDD of the plurality of first and second read-out ICs ROIC1 and ROIC2 to one data terminal SDD of the touch controller 222. For example, the second bus B2 connects a first data terminal SDD1 of the touch controller 222 to a data terminal SDD of the first read-out IC ROIC1 and a data terminal SDD of the second read-out IC ROIC2.

The third bus B3 connects different chip selection terminals CSN of the plurality of first and second read-out ICs ROIC1 and ROIC2 to one chip selection terminal CSN of the touch controller 222. For example, the third bus B3 connects a first chip selection terminal CSN1 of the touch controller 222 to a chip selection terminal CSN of the first read-out IC ROIC1 and a chip selection terminal CSN of the second read-out IC ROIC2.

The first and second read-out ICs ROIC1 and ROIC2 may be individually controlled by designating an upper one-bit of the address ADDR, matching the designated upper one-bit to identification numbers ID of the first and second read-out ICs ROIC1 and ROIC2, and setting a corresponding bit of the address ADDR for write driving and read driving.

According to still another embodiment of the present disclosure, the plurality of first and second read-out ICs ROIC1 and ROIC2 may have terminals to which identification numbers ID distinguished from other read-out ICs are input. The first and second read-out ICs ROIC1 and ROIC2 may be controlled according to any one among the upper bits of the address ADDR of touch drive setting data TDSS transmitted through the second bus B2 in the write mode W or the read request mode of the touch controller 222. For example, when any one of the upper bits of the address ADDR of the touch drive setting data TDSS is referred to as a read-out IC selection bit, the touch controller 222 transmits a read-out IC selection bit of "0" to the first and second read-out ICs ROIC1 and ROIC2. In this case, the touch controller 222 may activate communication with the first read-out IC ROIC1 receiving an identification number ID of "0" and deactivate communication with the second read-out IC ROIC2 receiving an identification number ID of "1." That is, the touch controller 222 may transmit an identification number ID of the read-out IC to communicate therewith through the read-out IC selection bit.

Accordingly, since the number of lines located between the touch controller 222 and the touch driver 221 including the plurality of first and second read-out ICs ROIC1 and ROIC2 is reduced, an area between the touch driver 221 and the touch controller 222 can be reduced.

Hereinafter, a data ready signal according to still another embodiment of the present disclosure will be described in detail with reference to FIG. 14.

Figure 14:
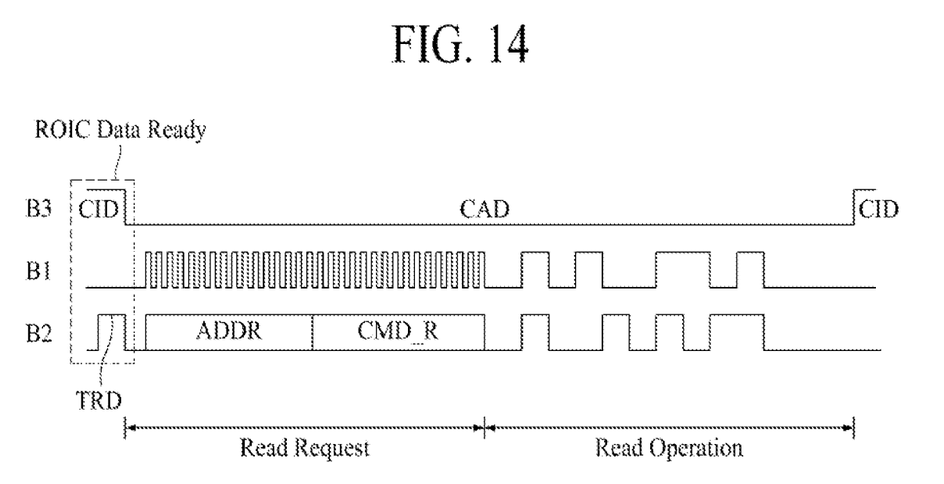
FIG. 14 is a timing diagram illustrating signals applied to first to third buses in a read request mode and a read operation mode according to still another embodiment of the present disclosure.

FIG. 14 is a timing diagram illustrating signals applied to the first to third buses in a read request mode and a read operation mode according to still another embodiment of the present disclosure.

As shown in FIG. 14, according to still another embodiment of the present disclosure, when communication deactivation data CID is applied to the third bus B3 and a transmission ready data TRD is applied to the second bus B2, the touch controller 222 operates in a read request mode. Specifically, when the communication deactivation data CID is applied to the third bus B3 and the touch controller 222 does not operate in a write mode, the read request mode, and a read operation mode, at least one of the first and second read-out ICs ROIC1 and ROIC2 of the touch driver 221 transmits the transmission ready data TRD through the second bus B2. In this case, the transmission ready data TRD means a signal that the read-out IC is ready to transmit touch sensing data TTSS to the touch controller 222. Accordingly, the touch controller 222 operates in the read request mode to transmit a clock to the read-out IC ROIC, which transmits the transmission ready data TRD, through the first bus B1 and transmit read request data through the second bus B2.

Hereinafter, a touch sensing signal filter of the touch controller according to still another embodiment of the present disclosure will be described in detail with reference to FIG. 15.

Figure 15:
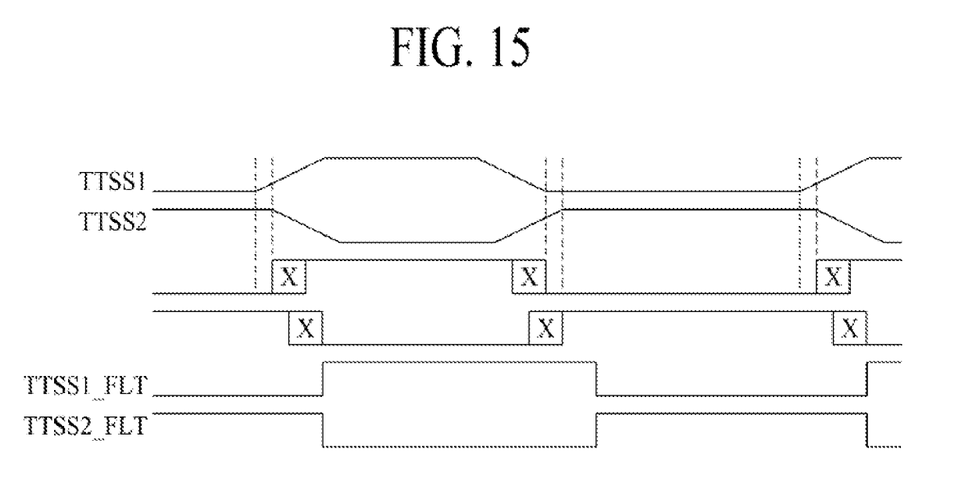
FIG. 15 is a diagram for describing an operation of a touch sensing signal filter of the touch controller according to still another embodiment of the present disclosure.

FIG. 15 is a diagram for describing an operation of the touch sensing signal filter of the touch controller according to still another embodiment of the present disclosure.

As shown in FIG. 15, a delay occurs between data received through the first bus B1 of the touch controller 222 and data received through the second bus B2 thereof, and thus a phase error and a noise may occur. Although not shown in the drawing, in order to eliminate the phase error and the noise, the first touch sensing data TTSS1 received from the read-out IC ROIC through the first bus B1 and the second touch sensing data TTSS2 received from the read-out IC ROIC through second bus B2 maintain the same value for a certain period of time, the touch controller 222 may further include a filter for acquiring stable signals TTSS1_FLT and TTSS2_FLT by passing the received first touch sensing data TTSS1 and second touch sensing data TTSS2. That is, the filter of the touch controller 222 may pass first and second touch sensing data TTSS1 and TTSS2 of the first and second touch sensing data TTSS1 and TTSS2 received through the first and second buses B1 and B2, which maintain the same value for a certain period of time, to prevent phase errors and noises of the first and second touch sensing data TTSS1 and TTSS2 from occurring.

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

In accordance with the present disclosure, since a read-out integrated circuit (IC) transmits data using a bus to which a clock is applied, the number of buses required to transmit and receive the data is reduced, and thus an area of the bus located between the read-out IC and a touch driver can be reduced.

In addition, since, in a read operation mode, a clock is not applied to the bus to which the clock is applied in a write mode and a read request mode, it is possible to prevent an electromagnetic interference (EMI) noise due to the clock.

Therefore, it should be understood that the above-described embodiments are not restrictive but illustrative in all aspects. The scope of the present disclosure is defined by the appended claims rather than the detailed description, and it should be construed that all alternations or modifications derived from the meaning and scope of the appended claims and the equivalents thereof fall within the scope of the present disclosure.

What is claimed is:

1. A touch sensing device comprising:
a touch controller configured to operate in a write mode during a display period and operate in a read request mode or a read operation mode during a touch sensing period; and
a touch driver configured to receive touch sensing data from a touch sensor during the touch sensing period and transmit the touch sensing data to the touch controller through a first bus and a second bus,
wherein the first bus is used for clock transmission in the write mode and the read request mode and is used for data transmission in the read operation mode,
the second bus is used for data transmission in the write mode, the read request mode, and the read operation mode,
in the write mode during the display period, the touch controller is configured to transmit clock and touch drive setting data to the touch driver,
in the read request mode during the touch sensing period, the touch controller is configured to transmit clock and read request data to the touch driver, and
in the read operation mode during the touch sensing period, the touch driver is configured to transmit touch sensing data to the touch controller.

2. The touch sensing device of claim 1, wherein the touch driver includes:
a receiver configured to receive the touch sensing data of a binary symbol from the touch sensor during the touch sensing period;
a first converter configured to convert the touch sensing data of the binary symbol into ternary symbol touch sensing data; and
a transmitter configured to transmit the ternary symbol touch sensing data,
wherein the touch driver transmits the ternary symbol touch sensing data to the touch controller through the first and second buses in the read operation mode.

3. The touch sensing device of claim 1, wherein, in the write mode, the touch controller transmits a clock to the touch driver through the first bus and transmits touch drive setting data to the touch driver through the second bus.

4. The touch sensing device of claim 1, wherein, in the read request mode, the touch controller transmits a clock to the touch driver through the first bus and transmits read request data to the touch driver through the second bus.

5. The touch sensing device of claim 1, wherein the touch controller includes a second converter configured to convert ternary symbol touch sensing data received from the touch driver into binary symbol touch sensing data.

6. The touch sensing device of claim 1, wherein:
the touch sensing data is converted into first touch sensing data and second touch sensing data of a ternary symbol by the touch driver;
the first and second touch sensing data are transmitted to the touch controller through the first and second buses; and the touch controller includes a filter configured to pass, when the first touch sensing data and the second touch sensing data are maintained at the same value for a certain period of time in the read operation mode, the first touch sensing data and the second touch sensing data.

7. The touch sensing device of claim 1, wherein the touch driver adds any one among a checksum bit, a parity bit, and a cyclic redundancy check (CRC) bit to the touch sensing data received from the touch sensor.

8. The touch sensing device of claim 1, wherein:
the touch driver includes a first read-out integrated circuit (IC) and a second read-out IC;
each of the first and second read-out ICs is connected to the touch controller through the first bus, the second bus, and a third bus; and
the first and second read-out ICs share at least one among the first bus, the second bus, and the third bus.

9. The touch sensing device of claim 8, wherein the touch controller transmits communication activation data through the third bus in the write mode, the read request mode, and the read operation mode.

10. The touch sensing device of claim 8, wherein, when transmission ready data is applied to the second bus during a period in which communication deactivation data is applied through the third bus, the touch controller operates in the read request mode.

11. The touch sensing device of claim 10, wherein:
the communication deactivation data is transmitted from the touch controller to the first and second read-out ICs; and
the transmission ready data is transmitted to the touch controller from at least one of the first and second read-out ICs.

12. The touch sensing device of claim 8, wherein the first and second read-out ICs share the third bus.

13. The touch sensing device of claim 12, wherein the first and second read-out ICs share the first and second buses.

14. The touch sensing device of claim 9, wherein the touch controller operates as a master and the first and second read-out ICs operate as slaves according to a serial peripheral interface (SPI) protocol.

15. A method of driving a touch sensing device, the method comprising:
during a display period, operating a touch controller in a write mode;
during a touch sensing period, operating the touch controller in a read request mode for requesting touch sensing data received from a touch sensor to a touch driver; and
during the touch sensing period, operating the touch controller in a read operation mode in which the touch controller receives the touch sensing data from the touch driver through a first bus and a second bus,
wherein the first bus is used for clock transmission in the write mode and the read request mode and is used for data transmission in the read operation mode,
the second bus is used for data transmission in the write mode, the read request mode, and the read operation mode,
when operating the touch controller in the write mode, the touch controller transmits clock and touch drive setting data to the touch driver,
when operating the touch controller in the read request mode, the touch controller transmits clock and read request data to the touch driver, and when operating the touch controller in the read operation mode, the touch driver transmits touch sensing data to the touch controller.

16. The method of claim 15, wherein:

the touch sensing data received from the touch sensor is data of a binary symbol; and during the touch sensing period, the touch driver converts the touch sensing data of the binary symbol into touch sensing data of a ternary symbol.

17. The method of claim 15, wherein, when the touch controller operates in the write mode during the display period, the touch controller transmits a clock to the touch driver through the first bus and transmits touch drive setting data to the touch driver through the second bus.

18. The method of claim 15, wherein, when the touch controller operates in the read request mode during the touch sensing period, the touch controller transmits a clock to the touch driver through the first bus and transmits read request data to the touch driver through the second bus.

19. The method of claim 15, wherein, when transmission ready data is applied to the second bus and communication deactivation data is applied to a third bus, the touch controller operates in the read request mode.

* * * * *